Dec. 5, 1961    O. J. UNDERWOOD    3,011,702

DIVE BOMBING COMPUTERS

Filed July 2, 1956

Fig. 1

Fig. 2

INVENTOR.
ORVILLE J. UNDERWOOD

BY Frederick E. Lange

ATTORNEY

United States Patent Office 3,011,702
Patented Dec. 5, 1961

3,011,702
DIVE BOMBING COMPUTERS
Orville J. Underwood, Hopkins, Minn., assignor to Minneapolis-Honeywell Regulator Company, Minneapolis, Minn., a corporation of Delaware
Filed July 2, 1956, Ser. No. 595,546
7 Claims. (Cl. 235—61.5)

This invention relates generally to computer apparatus and is more particularly related to computer apparatus for computing the solution of a second order equation as in the computation of a lead angle correction signal from variations in the dive angle of a craft in a dive bombing system.

The purpose of this invention is to provide a second order computer for use in control systems wherein it is desired to control a first condition according to variations in a second condition, where a second order relationship exists between the first and second conditions. An example of the use of my invention is shown in this application wherein it is desired to compute a correction signal for lead angle in a dive bombing system from deviations in the attitude of a craft; here, a second order relationship exists between lead angle and dive angle in the solution of a given dive bombing problem.

In previously known dive bombing systems it has been proposed to provide a linear correction for lead angle using a simple potentiometer in a manner well known in the art. This of course resulted in intolerable errors even over a limited range of operation. It has also been proposed to provide a somewhat unwieldy "all-computing" system which by definition requires a great deal of space, power and weight in a craft. In my invention I have provided a computer which utilizes a minimum of components, but which is accurate, versatile and requires a minimum of attention from the pilot. I have further provided a device which is compatible with existing tables of values for dive bombing so that in preparation for an actual mission, three values of lead angle for particular values of dive angle are selected from existing tables and the computer is adjusted accordingly. From this point on, the pilot need only be concerned with keeping his sight on the target in order to execute a successful mission.

It is therefore an object of this invention to provide a computer for the continuous solution of second order equations where at least three positions on a curve defined by said equation are known.

Other objects and advantages of my invention will become apparent from the appended detailed description and drawings in which:

FIGURE 1 is a schematic representation of my invention embodied in a dive bombing system; and FIGURE 2 is a curve representing the equation of which solution is required for proper execution of a dive bombing mission.

Referring now to FIGURE 1, I have shown computer apparatus for computing a lead angle correction signal to control the position of a projected spot of light 175 on a windshield 170 so as to cause the pilot to fly his craft, by sighting through the spot at a target on line of sight 173, in a proper course to score a direct hit. The apparatus in FIGURE 1 may conveniently be separated into two portions, one being, in essence, the elevation servo system from a standard Mark VI gunsight and includes that portion of the circuit following synchro 134. The other portion comprises my computer for providing a lead angle correction signal and includes that portion of FIGURE 1 which precedes synchro 134.

The gunsight referred to above comprises; an electronic amplifier 150 having input terminals 151 and 152 and a pair of terminals 153 for energization from a suitable source of alternating current; a motor 160 which is reversibly operated by amplifier 150 through a connecting cable 156; an adjustable mirror 164, which is adapted to reflect a spot of light from a light source 171 to windshield 170; driving means 163 connecting mirror 164 to a gear box 162; driving means 161 connecting the output of motor 160 to gear box 162; a receiver synchro 140, connected to supply an input signal to amplifier 150 through lead 155 and terminal 152 and lead 154 and terminal 151; and further driving means 165 connecting mirror 164 to synchro 140 for follow-up purposes. Synchro 140 is connected to the output of a transmitter synchro 134 through a plurality of leads designated by reference character 141. It is seen then, that the gunsight is a simple follow-up servo system for positioning a spot of light 175 in accordance with the signal input to synchro 140.

In the computer referred to above, a first bridge 10 comprises a potentiometer 11 having a wiper 12, and a potentiometer 14 having a wiper 15. Potentiometers 11 and 14 are connected in parallel at terminals 17 and 18. Wiper 15 is connected to ground through lead 16. A transformer 13, adapted for connection to a suitable source of alternating current, is connected across terminals 17 and 18 to energize bridge 10.

A second bridge 20 comprises potentiometers 21 and 23 having wipers 22 and 24 respectively. Potentiometers 21 and 23 are connected in parallel at terminals 26 and 27. Wiper 24 is connected to ground through lead 25.

A third bridge 30 comprises potentiometers 31 and 33 having wipers 32 and 34 respectively. Potentiometers 31 and 33 are connected in parallel at terminals 36 and 37. Wiper 34 is connected to ground through lead 35.

A fourth bridge 40 comprises potentiometers 41 and 43 having wipers 42 and 44 respectively. Potentiometers 41 and 43 are connected in parallel at terminals 45 and 46. Wiper 44 is connected to wiper 32 through lead 38.

A fifth bridge 50 comprises potentiometers 51 and 53 having wipers 52 and 54 respectively. Potentiometers 51 and 53 are connected in parallel at terminals 55 and 56. Wiper 54 is connected to wiper 42 through lead 47.

A sixth bridge 60 comprises potentiometers 61 and 64 having wipers 62 and 65 respectively. Potentiometers 61 and 64 are connected in parallel at terminals 66 and 67. A transformer 63, energized from a suitable source of alternating current, is connected across terminals 66 and 67 to energize bridge 60. Wiper 65 is connected to wiper 52 through lead 57.

A vertical gyro 70 is connected to position potentiometer wipers 15 and 24 through driving means 71 in accordance with the pitch attitude $Dva$ of the craft.

An adjustable knob 180 is connected to position wipers 12 and 22, through driving means 181, in accordance with a desired nominal value of dive angle $Dva(0)$.

An adjustable knob 182 is connected to position wipers 32 and 44, through driving means 183, in accordance with the value of lead angle $Pva$ (−10) at a dive angle of (for example) 10° less than that desired.

An adjustable knob 184 is connected to position wipers 34 and 52, through driving means 185, in accordance with the value of lead angle $Pva$ (+10) at a dive angle of 10° more than that desired.

An adjustable knob 186 is connected to position wipers 42, 54, and 65, through driving means 187, in accordance with the value of lead angle $Pva$ (0) at the desired nominal dive angle.

Bridge 10 is connected to an amplifier 80 which may be of the type well known in the art as a cathode follower amplifier. Amplifier 80 includes leads 81 for a connection to a suitable source of alternating current, input terminals 82 and 83 and output terminals 84 and 85. A transformer 90 has a primary winding 91, connected across output terminals 84 and 85, and a pair of secondary windings 92 and 93. Input terminal 82 is connected to wiper 12 through lead 87 and input terminal 83 is connected to ground through lead 86.

Bridge 20 is energized from secondary winding 92 on transformer 90, through lead 94 and terminal 26 and lead 95 and terminal 27. Bridge 30 is energized from secondary winding 93 on transformer 90, through lead 96 and terminal 36 and lead 97 and terminal 37.

Bridge 20 is connected to an amplifier 100 which has the same operating characteristics as amplifier 80 and includes a pair of power leads 101, for connection to a suitable source of alternating current, a pair of input terminals 102 and 103, and a pair of output terminals 104 and 105. A transformer 110 has a primary winding 111, connected across output terminals 104 and 105, and a pair of secondary windings 112 and 113. Input terminal 102 is connected to wiper 22 through lead 107 and input terminal 103 is connected to ground through lead 106.

Bridge 40 is energized from secondary winding 112 on transformer 110 through lead 114 and terminal 45 and through lead 115 and terminal 46. Bridge 50 is energized from secondary winding 113 through lead 116 and terminal 55 and through lead 117 and terminal 56.

Another amplifier 120 has a pair of power leads 121 for connection to a suitable source of alternating current, and a pair of input terminals 122 and 123. Terminal 122 is connected to wiper 62 through lead 125 and terminal 123 is connected to ground through lead 124. The output of amplifier 120 is connected to control the operation of a reversible motor 130 through cable 126. Motor 130 is operatively connected to synchro 134 through driving means 131, gear box 132 and driving means 133. Synchro 134 is provided with a pair of leads 135 for energization from a suitable source of alternating current. Wiper 62 is also connected to the output of gear box 132 through driving means 136, gear box 137, and driving means 138.

The following is a table of values of components used in the apparatus shown schematically in FIGURE 1.

| Reference character: | Value |
|---|---|
| 11 | 10 K ohms. |
| 14 | 10 K ohms. |
| 21 | 10 K ohms. |
| 23 | 10 K ohms. |
| 31 | 10 K ohms. |
| 33 | 10 K ohms. |
| 41 | 10 K ohms. |
| 43 | 10 K ohms. |
| 51 | 10 K ohms. |
| 53 | 10 K ohms. |
| 61 | 10 K ohms. |
| 64 | 10 K ohms. |
| 13 | 4½ volts. |
| 63 | 9 volts. |
| 80 | Gain of 10. |
| 100 | Gain of 10. |

Referring now to FIGURE 2, I have shown a curve 200 having various points designated by the reference characters 201, 202 and 203. Curve 200 is illustrative of the relationship existing between dive angle (D$va$) and lead angle (P$va$) and is a second order curve. The point 202 is described by the coordinates P$va$ (0) and D$va$ (0) and corresponds to a desired, nominal dive angle, which is a dive angle thought to be the best choice for a particular mission and is obtained from a suitable dive bombing table. The points 201 and 203 correspond to values of dive angles of ten degrees less and ten degrees more, respectively, than the desired nominal dive angle. The location, or value, of points 201 and 203 as well as point 202, is governed by existing bombing tables which usually provide increments of ten degrees of dive angle.

In the particular dive bombing case shown and described in this specification and drawing, the problem is one of correcting a preset lead angle P$va$(0) by a factor $\Delta$P$va$ to give an instantaneous value P$va$ which corresponds to the instantaneous value D$va$ of dive angle as recorded in bombing tables, the angle D$va$ differing by an angle $\Delta$D$va$ from a preset value D$va$(0) corresponding to preset lead angle P$va$(0). The foregoing problem may be defined mathematically by the expression $$Pva = Pva(0) + \Delta Pva \quad (1)$$

where $$\Delta Pva = f(\Delta Dva) \quad (2)$$

It is known from FIGURE 2 and the bombing tables on which it is based that $$\Delta Pva = K_1(\Delta Dva) + K_2(\Delta Dva)^2 \quad (3)$$

A solution for the constants of this equation may be made by the method of least squares, as disclosed in "Treatment of Experimental Data" by Warthing and Geffner, published by John Wiley and Sons, and results in the following values for the two consonants:

$$K_1 = \frac{Pva(-10) - Pva(+10)}{20} \quad (4)$$

$$K_2 = \frac{(Pva(-10) - Pva(0)) - (Pva(0) - Pva(+10))}{200} \quad (5)$$

Having evaluated the constants, the complete equation to be solved by the computer shown in FIGURE 1 is as follows:

$$\Delta Pva = \frac{Pva(-10) - Pva(+10)}{20} \Delta Dva$$
$$+ \frac{(Pva(-10) - Pva(0)) - (Pva(0) - Pva(+10))}{200}(\Delta Dva)^2 \quad (6)$$

It may also be determined from further computations that the gain of amplifiers 80 and 100 is 10, and that the energization voltage of bridge 10 is one-half that of bridge 60.

*Operation*

The use of my invention in an actual dive bombing mission requires the selection of the bombing table for the particular bomb characteristics, etc. This table provides values of lead angle (P$va$) corresponding to various dive angles. Before leaving on a mission, the pilot selects a desired nominal dive angle D$va$(0) which is suitable for the particular mission and, using the bombing table, determines values of lead angle for each of three values of dive angle, i.e. lead angle at nominal dive angle less 10 degrees P$va$(−10), lead angle at nominal dive angle plus 10 degrees P$va$(+10), and lead angle at nominal dive angle P$va$(0).

A value of D$va$(0) is set into the computer by adjusting graduated knob 180 which simultaneously adjusts wipers 12 and 22 on potentiometers 11 and 21 respectively.

A value of P$va$(−10) is provided by adjusting graduated knob 182 which simultaneously adjusts wipers 32 and 44 on potentiometers 31 and 43 respectively.

A value of P$va$(+10) is provided by adjusting graduated knob 184 which simultaneously adjusts wipers 34 and 52 on potentiometers 33 and 51 respectively.

A value of P$va$(0) is provided by adjusting graduated knob 186 which adjusts wipers 42, 54 and 65 on potentiometers 41, 53 and 64 respectively.

Having set in the various values, the pilot need only fly his craft at an angle approximating the value of nominal dive angle, since the computer will supply a signal to the sight to provide a proper lead angle for any dive angle within reasonable angular limits for example, plus or minus twenty degrees.

In the actual execution of a mission it will first be assumed that the actual dive angle coincides with the desired nominal dive angle $Dva(0)$ so that the voltage existing between wipers 12 and 15 on bridge 10 is equal to zero. In this condition there will be no signal $\Delta Dva$ and consequently no input to the computer. Bridge 60, since it has potentiometer wiper 65 positioned in accordance with a desired value of lead angle $Pva(0)$ at the desired nominal value of dive angle $Dva(0)$, provides an input to amplifier 120 to cause motor 130 to drive follow-up wiper 62 on bridge 60 in a direction to cause balance. Since synchro 134 also connected to the output of motor 130, a signal is applied to synchro 140, the output of which is connected to amplifier 150. Amplifier 150 causes motor 160 to drive mirror 164 to a position that balances or nulls the signal applied to synchro 140. When the two servo systems are in balance the spot of light 175 is positioned on windshield 170 so that the pilot is flying his craft at the proper attitude to score a hit when his line of sight 173 includes the spot 175 and the desired target (not shown).

Assuming now that the craft deviates from the desired nominal dive angle $Dva(0)$. Wiper 15 on bridge 10 is displaced by the action of vertical gyro 70. A signal, $\Delta Dva$ appearing between wipers 12 and 15, is impressed across the input terminals of amplifier 80. Amplifier 80 produces an output across secondary windings 92 and 93 on transformer 90 which is proportional to $\Delta Dva$. The output on secondary winding 92 is used to energize bridge 20 and since bridge 20 has the same inputs as bridge 10, the output of bridge 20 is a signal proportional to $\Delta Dva^2$. It will be noted at this point that bridge 20 is a means for supplying a signal which is proportional to $\Delta Dva^2$. An illustration of this function may be had from the example where wiper 15 is displaced a given percentage from a null position, for instance 10 percent. Since wiper 25 is also displaced in the amount of 10 percent, the output of bridge 20 is increased in the amount of 10 percent $\times$ 10 percent or 1 percent. This is so because bridge 20 is energized with a voltage proportional to the 10 percent displacement of wiper 15 on bridge 10 and then wiper 23 on bridge 20 is displaced by 10 percent also, the product of the two is then 1 percent or the square of the wiper displacement. This signal is in turn applied to amplifier 100. Amplifier 100 thus provides an output across secondary windings 112 and 113, which is proportional to $\Delta Dva^2$.

The output of secondary winding 93 is connected to energized bridge 30 which has wipers 32 and 34 positioned to modify the $\Delta Dva$ signal in accordance with the value of the constant $K_1$ so that the output of bridge 30 is proportional to the first term $(K_1\Delta Dva)$ in the equation to be solved.

The output of secondary winding 112 is connected to energize bridge 40 which has wipers 42 and 44 positioned to modify the $\Delta Dva^2$ signal in accordance with the first term of the numerator of Equation 5. The output on secondary winding 113 is similarly connected to energize bridge 50 which has wipers 52 and 54 positioned to modify the $\Delta Dva^2$ signal so that bridge 50 has an output proportional to the second term of the numerator of Equation 5.

The outputs of bridges 30, 40 and 50 are connected in series so as to provide a summation of the three outputs. Thus, the voltage appearing at lead 57 is proportional to $\Delta Pva$. This voltage is applied through bridge 60 to amplifier 120. Amplifier 120 causes motor 130 to operate in a direction to rebalance bridge 60 and also to cause synchro 134 to supply a signal to synchro 140. This causes the servo controlling the mirror 164 to actuate the mirror 160 to move spot 175 to a position which will cause the pilot to operate the craft in the correct manner for proper execution of his mission.

It should be obvious to those skilled in the art, that while I have shown and described the present invention for use in a dive bombing system, it is capable of use in a great many systems for the control of a dependent variable in response to variations in an independent variable where a second order relationship between the two variables exists.

It will be understood that modifications may be made in the design and arrangement of parts without departing from the spirit of my invention.

What is claimed is:

1. In a dive bombing control system, means for computing a correction for lead angle for variations in dive angle from a nominal position comprising; a source of signal indicative of a departure from a nominal dive angle; first means modifying said signal in accordance with known values of lead angle for dive angles negative and positive with respect to said nominal dive angle; means for squaring said signal; second means modifying said squared signal in accordance with known values of lead angle for said nominal dive angle and for dive angles negative and positive with respective to said nominal dive angle; and means combining the outputs of said first and second modifying means to provide a correction signal for lead angle.

2. In a device of the class described, means for supplying a lead angle correction for deviations in the attitude of a craft from a predetermined dive angle comprising; signal generating means for determining a deviation of dive angle; a first means for modifying the output of said signal generating means in accordance with the values of lead angle for a known deviation in dive angle; squaring means; a second means for modifying the squared output of said signal generating means in accordance with the values of lead angle for the desired dive angle and with the values of lead angle for a known deviation in dive angle; and combining means for combining the outputs of said first and second modifying means so as to provide an output in terms of a lead angle correction for the deviation in dive angle.

3. Apparatus of the class described comprising, in combination; first adjustable means for controlling a dive bomb sight on an aircraft; computing means for computing a desired lead angle corresponding to the dive angle of said aircraft, said computing means including means for providing a signal indicative of the dive angle of said aircraft, means for squaring said signal, means for modifying said signal in accordance with values of lead angle at a pair of predetermined dive angles, means for modifying said squared signal in accordance with the values of lead angles at three predetermined dive angles; and means connecting the output of said computing means to said first adjustable means to cause said first adjustable means to control the operation of said bomb sight.

4. In a dive bombing system, apparatus for computing a lead angle compensation signal for a departure in the attitude of a craft from a desired attitude comprising; means for generating a first signal indicative of a departure in attitude of a craft from a desired attitude; means for modifying said first signal in accordance with the values of a pair of lead angles corresponding to dive angles greater and less than the dive angle of the desired attitude of a craft so as to provide a second signal; means for squaring said first signal; means for modifying said squared first signal in accordance with the values of lead angle for the dive angle of the desired attitude and for dive angles greater and less than said desired attitude so as to provide a third signal; means for combining said second and third signals to provide a fourth signal indicative of lead angle required for the actual dive attitude of said craft; and amplifier-motor means for positioning an output device in accordance with said fourth signal.

5. In a control system for continually controlling the attitude of a dive bombing sight to provide a lead angle corresponding to the dive angle attitude of a craft, a computer comprising; means for providing a signal indicative of a departure in attitude of a craft from a nominal attitude, first means for modifying said signal in accordance with values of lead angle corresponding to values of dive angle for dive angles positive and negative with respect to said nominal dive angle; means for squaring said signal; second means for modifying said squared signal in accordance with the values of lead angle corresponding to said nominal dive angle and to values of lead angle for said dive angles positive and negative with respect to said nominal dive angle; and means for combining the outputs of said first and second modifying means so as to provide a signal proportional to the lead angle required for the dive angle attitude of said craft.

6. In apparatus of the class described an electrical curve fitting computer for computing a signal to compensate for variations from a predetermined attitude comprising; a source of signal indicative of a departure from a predetermined attitude; first modifying means connected to said source of signal for modifying said signal according to values corresponding to a pair of known positions on a curve which appear on opposite sides of a position corresponding to a value desired at said predetermined attitude; second modifying means connected to said first source of signal for squaring and modifying said signal in accordance with the values of said three known positions; and means for combining the output of said first and second modifying means to provide an output signal according to a predetermined curve.

7. In apparatus of the class described: adjusting means for varying the attitude of a dive bombing sight, with respect to the longitudinal axis of a craft, in accordance with a control signal; a source of signal indicative of deviation of the pitch attitude of the craft from a predetermined value; second order computer means giving an output which is a second order function of an input supplied thereto; and means connecting said computer means to said source and said adjusting means so that the input for said computer means comprises the signal from said source, and the control signal for said adjusting means comprises the output from said computer means.

References Cited in the file of this patent

UNITED STATES PATENTS 2,529,324    Blackett et al. _____ Nov. 7, 1950